United States Patent [19]

Chidsey et al.

[11] Patent Number: 5,326,626

[45] Date of Patent: Jul. 5, 1994

[54] STABLE POLAR OPTICALLY NONLINEAR MULTILAYER FILMS AND DEVICES USING THE SAME

[75] Inventors: Christopher E. D. Chidsey, North Plainfield; Howard E. Katz, Summit; Thomas M. Putvinski, Scotch Plains, all of N.J.; Geoffrey R. Scheller, Allentown, Pa.; Marcia L. Schilling, Basking Ridge; William L. Wilson, Somerville, both of N.J.

[73] Assignee: AT&T Bell Laboratories, Murray Hill, N.J.

[21] Appl. No.: 992,515

[22] Filed: Dec. 17, 1992

Related U.S. Application Data

[62] Division of Ser. No. 779,430, Oct. 17, 1991.

[51] Int. Cl.$^5$ .............................................. B05D 3/10
[52] U.S. Cl. .................................... 427/301; 427/165; 427/299
[58] Field of Search ............... 427/299, 301, 165, 169, 427/430.1

[56] References Cited

U.S. PATENT DOCUMENTS

| | | | |
|---|---|---|---|
| 4,732,783 | 3/1988 | Choe et al. | 427/164 |
| 4,819,210 | 4/1989 | Miura et al. | 365/106 |
| 4,859,876 | 8/1989 | Dirk et al. | 307/425 |
| 4,987,023 | 1/1991 | Sato et al. | 428/215 |
| 5,079,595 | 1/1992 | Suzuki et al. | 427/430.1 |
| 5,132,181 | 7/1992 | Wefers et al. | 428/457 |
| 5,156,918 | 10/1992 | Marks et al. | 428/447 |

OTHER PUBLICATIONS

Netzer, L. et al., "Adsorbed monolayers versus Langmuir-Blodgett Monolayers," *Thin Solid Films*, vol. 106 (1983), pp. 67–76.

Netzer, L. et al., "A New-Approach to Construction of Artificial Monolayer Assemblies," 0 *J. Am. Chem. Soc.*, vol. 105, 1983, pp. 674–676.

Rivka Maoz et al., "Self-Assembling Monolayers in the Construction of Planned Supramolecular Structures and as Modifiers of Surface-Properties," *J. de Chemie Physique*, vol. 85, No. 11/12, 1988, pp. 1059–1065.

DeQuan, Li, et al., "Chromophoric Self-Assembled Multilayers. Organic Superlattice Approaches to (List continued on next page.)

Primary Examiner—Patrick J. Ryan
Assistant Examiner—Marie R. Macholl
Attorney, Agent, or Firm—Oleg E. Alber

[57] ABSTRACT

This invention embodies an optical medium which consists of polar, multi-monomolecular layers of organic dye molecules with a net polar orientation, considerable second order optical nonlinearity, and excellent thermal stability. The medium is prepared by repeated sequential depositions on a surface of multivalent metal ions, e.g. $Zr^{4+}$, and organic dyes terminated with an acidic functionality, e.g. a phosphonic acid, followed by activation of the surface for the next deposition sequence. The monolayers are deposited in the form of a multilayer film containing up to 1000 or more monolayers. The monolayers are deposited from liquid solutions; therefore they may be deposited on substrates having diverse topography and configurations. Second harmonic generation (SHG) analysis establishes that the multilayers have uniform polar order which does not decrease with increasing numbers of monolayers in the film. As determined by SHG, the inorganic interlayers impart orientational stability to the dye molecules up to 150° C. and higher. The optical medium is useful in electrooptical or optical parametric devices comprising an optically nonlinear element and means for providing an optical input to and output from said element wherein said element comprises the nonlinear optical medium supported on a suitable base. When said device is employed in an electrooptic mode, it includes means for applying an electric field and/or optical input to said element for altering an optical property thereof.

11 Claims, 5 Drawing Sheets

OTHER PUBLICATIONS

Thin-Film Nonlinear Optical Materials," *J. Am. Chem. Soc.*, vol. 112, No. 20, 1990, pp. 7389-7390.

Mallouk et al., "Adsorption of Ordered Zirconium 1,10-Decanebisphosphonate Multilayers on Silicon Surfaces," *J. of Physical Chem. Society*, vol. 110, (1988) pp. 618-620.

Mallouk et al., "Adsorption of Ordered Zirconium Phosphonate Multilayer Films on Silicon and Gold Surfaces," *J. of Physical Chem. Society*, vol. 92, (1988) pp. 2597-2601.

Johnstone, W. et al., "Fibre Optic Modulators Using Active Multimode Waveguide Overlays," *Electronic Letters*, vol. 27, No. 11, May 23, 1991, pp. 894-896.

Wilkinson, M. et al., "Optical Fibre Modulator Using Electrooptic Polymer Overlay," *Electronic Letters*, vol. 27, No. 11, May 23, 1991, pp. 979-801.

Osterfeld, M. et al., "Monitoring Electric Field Induced Refractive Index Changes in Liquid Crystals with Polymer Lightguides," *Mol. Cryst. Liq. Cryst.*, vol. 183, 1990, pp. 321-328.

Putvinski et al., "Self-Assembly of Organic Multilayers with Polar Order Using Zirconium Phosphate Bonding between Layers," Reprinted From *Langmuir*, vol. 6, No. 10, 1990, pp. 1567-1571.

Katz, et al., "Quaterthiophenediphosphonic acid (QDP): A Rigid, Electron-Rich Building Block for Zirconium-Based Multilayers", *Chem. Mater.* vol. 3, No. 4, 1991, pp. 699-703.

STABLE POLAR OPTICALLY NONLINEAR MULTILAYER FILMS AND DEVICES USING THE SAME

This is a division of application Ser. No. 07/779,430 filed Oct. 17, 1991.

TECHNICAL FIELD

This invention is concerned with nonlinear optical devices and optically nonlinear layered films useful in such devices.

BACKGROUND OF THE INVENTION

Devices based upon the nonlinear optical properties of materials are known in the art. Such devices include electrooptical modulators and switches, frequency converters, frequency doublers, optical mixers, optical parametric oscillators and amplifiers, directional couplers and data processors. Typically, these devices have utilized as the optically nonlinear media inorganic crystals, such as $LiNbO_3$, organic materials, such as 2-methyl-4-nitroaniline, and poled polymers containing dipolar dye moieties. However, due to the difficulties in preparing uniform, stable and properly oriented films of such materials for use in integrated devices, an effort has been directed recently to organic multilayer thin films as the active media in second-order nonlinear optical devices. The use of such films would be highly advantageous because organic composites can exhibit nonlinear susceptibilities equaling or exceeding those of such inorganic materials as lithium niobate and could be deposited on various substrates from liquid solutions.

Jacob Sagiv and co-workers proposed formation of multilayer films by a "self-assembly" strategy, which is based on repeated formation of monolayers by the irreversible chemisorption of molecules from homogeneous solutions. See Lucy Netzer et al., "Absorbed Monolayers versus Langmuir-Blodgett Monolayers—Why and How? II: Characterization of Built-Up Films Constructed by Stepwise Absorption of Individual Monolayers", *Thin Solid Films*, Vol. 106 (1983), pp. 67–76; Lucy Netzer and Jacob Sagiv, "A New Approach to Construction of Artificial Monolayer Assemblies, *Journal of the American Chemical Society*, Vol. 105, 1983, pp. 674–676; and Rivka Maoz et al., "Self-Assembling Monolayers in the Construction of Planned Supermolecular Structure and as Modifiers of Surface Properties", *Journal de Chemie Physique*, Vol. 85, No. 11/12, 1988, pp. 1059–1065. To assure layer-by-layer deposition, the chemisorption process is designed to be self-limiting at one monolayer, and a subsequent chemical treatment is used to reactivate the surface for chemisorption of the next monolayer. However, while Sagiv and co-workers used the self-assembly procedure for formation of monolayers into multilayer assemblies, the process was not suited for facile preparation of properly functionalized organic multilayer films with polar orientation. DeQuan Li et al. suggested self-assembly of organic multilayers into nonlinear optical thin films. Li et al. modified the self-assembly technology of Sagiv by introducing soft polymeric layers transverse to the stacking direction of the monolayers. See DeQuan Li, "Chromophoric Self-Assembled Multilayers, Organic Superlattice Approaches to Thin Film Non-Linear Optical Materials", *Journal of the American Chemical Society*, Vol. 112, No. 20, 1990, pp. 7389–7390. However, this procedure suffered from a cumbersome process and included much material that is not optically active.

It would be useful to develop alternative methods for depositing organic multilayers using simple chemical processes to form films containing a large volume fraction of optically nonlinear materials, with a high degree of polar orientation and stability.

SUMMARY OF THE INVENTION

This invention embodies an optical medium which consists of multi-monomolecular layers of organic dye molecules with a net polar orientation, considerable second order optical nonlineariry, and excellent thermal stability. The medium is prepared by repeated sequential depositions on a surface of multivalent metal ions, e.g. $Zr^{4+}$, and organic dyes terminated with an acidic functionality, e.g. a phosphonic acid, followed by activation of the surface for the next deposition sequence. The monolayers are deposited in the form of a multilayer film containing up to 1000 or more monolayers. The monolayers are deposited from liquid solutions; therefore they may be deposited on substrates having diverse topography and configurations. Second harmonic generation (SHG) analysis establishes that the multilayers have uniform polar order which does not decrease with increasing numbers of monolayers in the film. As determined by SHG, the inorganic interlayers impart orientational stability to the dye molecules up to 150° C. and higher.

The optical medium is useful in electrooptical or optical parametric devices comprising an optically nonlinear element and means for providing an optical input to and output from said element wherein said element comprises the nonlinear optical medium supported on a suitable base. When said device is employed in an electrooptic mode, it includes means for applying an electric field and/or optical input to said element for altering an optical property thereof.

DETAILED DESCRIPTION

Figure 1:
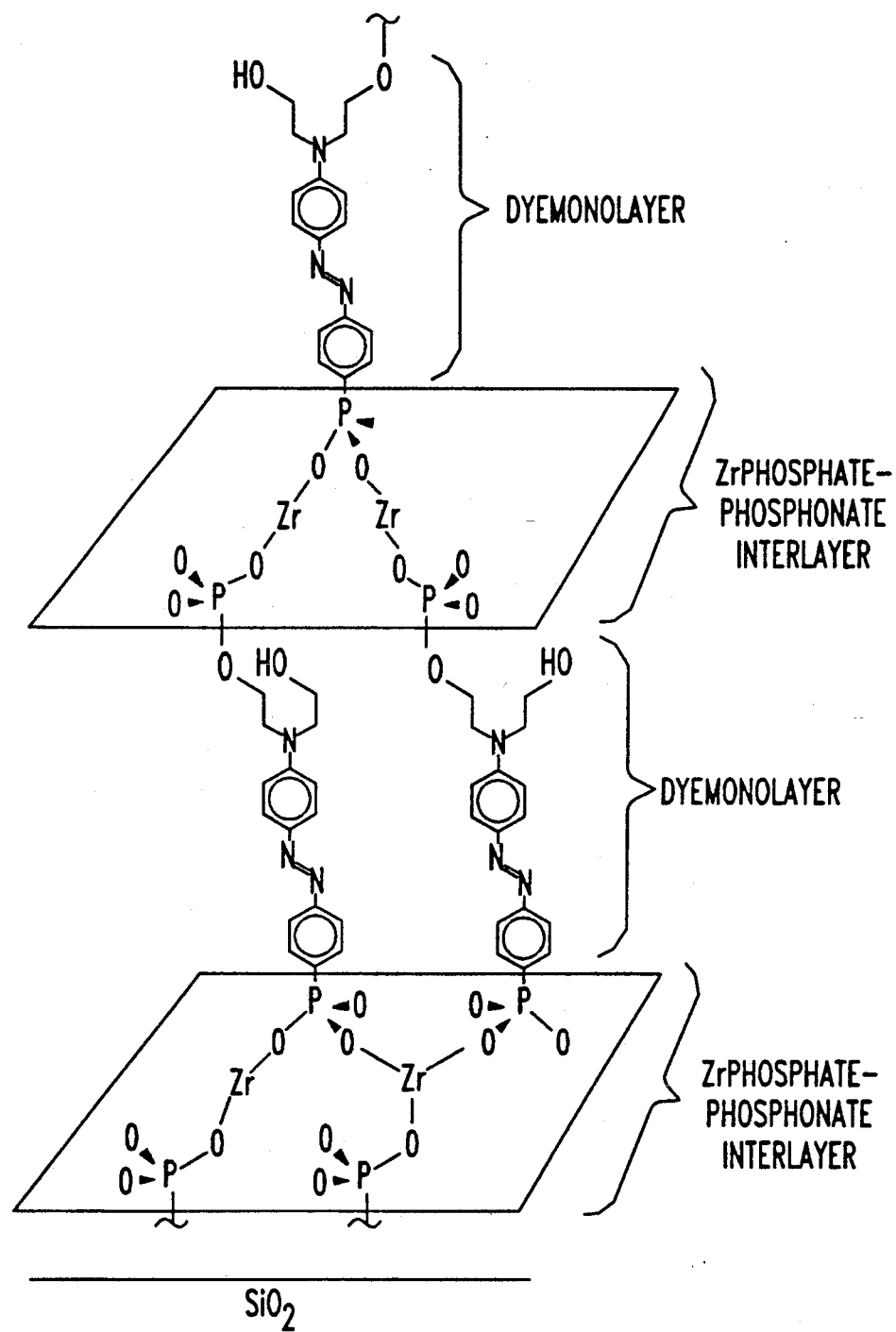
FIG. 1 is a schematic representation of an exemplary dye multilayer film.

The films described herein and which are useful for incorporation in the nonlinear optical devices are composed of multiple monolayers of dye molecules joined by bonds between pendant $—PO_3^{2-}$ groups on the dye molecules and multivalent metal cations, such as $Zr^{4+}$, in such a way that the dye molecules have a predominant polar orientation.

Mallouk and co-workers demonstrated construction of inorganic multilayers based on analogy with the solid-state structure of bulk zirconium diphosphonates. These multilayers lack polar orientational order and are held together by strong bonding between $-PO_3^{2-}$ groups and $Zr^{4+}$. See *Journal of the Physical Chemistry* Vol. 92, pages 2597-2601, (1988), and *Journal of the American Chemical Society*, Vol. 110, pages 618-620 (1988). The invention described below utilizes the strong bonding between pendant $-PO_3^{2-}$ groups and multivalent metal cations in a novel strategy to assemble stable, polar-oriented multilayers.

The films are produced by a self-assembly procedure in which each monolayer is formed by the chemisorption of the dye molecules from homogeneous solutions. The chemisorption process is designed to be self-limiting at one monolayer, and a subsequent chemical treatment is used to reactivate the surface for the chemisorption of the next monolayer. The resulting multilayers are resistant to dissolution and reorientation of the dye molecules by virtue of the strong bonding, and exhibit the strength and temperature stability normally associated with such robust materials as inorganic crystals, ceramics and high-performance polymers.

The deposition of the multilayer film may be described generally as follows: The deposition begins with the chemical modification of a support to provide phosphoryldioxy groups at the surface. Hereinafter by "phosphoryldioxy group" we refer to the $-PO_3^{2-}$, $-PO_3H^-$ and $-PO_3H_2$ groups present in phosphonic acids and their salts, and to the monoesters, monothioesters and monoamides of phosphoric acid and their salts. Various methods for the surface modification may be employed as appropriate to the particular substrate. One method that is applicable to silica, silicate glass or oxidized silicon substrates is to treat the surface with a trialkoxy-($\omega$-aminoalkyl)silane to produce a surface rich in $-NH_2$ groups. This surface is then treated first with $POCl_3$ and then with water to form monoamides of phosphoric acid at the surface. Other chemical groups which are acceptable forms of the requisite phosphoryldioxy group, are the alkyl and aryl monoamides, monoesters and monothioesters of phosphoric acid, and alkyl and aryl phosphonic acids. Other acidic groups which ligate metal ions, such as arsonic acids, may also be appropriate.

The deposition of each monolayer in the multilayer film consists of at least three steps. In the first step, the phosphoryldioxy surface is treated with a solution of a multivalent metal salt in an appropriate solvent, resulting in a surface terminated with metal ions bound to $-PO_3^{2-}$. In the second step, the metal terminated surface is treated with an organic dye containing a phosphoryldioxy group, such as phosphonic acid, monoesters or monoamides or monothioesters of phosphoric acid and their salts. This results in a dye monolayer attached to the $-PO_3^{2-}$-metal layer by ionic forces and coordinative bonding. The dye molecule is chosen so that the other, unattached, end of the dye molecule has a group, such as $-OH$, which can be chemically modified to provide new phosphoryldioxy groups. In the third step, the dye terminated surface is modified to provide these phosphoryldioxy groups. Each repetition of the above three steps results in the deposition of an additional monolayer to the growing multilayer film. Films containing up to 1000 and even more monolayers are readily obtainable by this type of treatment.

In an exemplary embodiment, silicon and glass substrates were cleaned with a solution of 3 volumes of $H_2SO_4$ and 1 volume of 30% $H_2O_2$ and treated with aminopropyltrimethoxysilane to provide amine-terminated surfaces. The amine-terminated surface was phosphorylated for 5 to 10 min in 0.2M $POCl_3$-0.2M collidine in acetonitrile at room temperature and rinsed with water.

The monolayer deposition steps consisted of i) treatment for 5 min in 5 mM aqueous $ZrOCl_2$ at room temperature and rinsing with water, ii) immersion for 10 min in a solution of 1.5 mM 4-(4-(N,N-bis(2-hydroxyethyl)amino)phenylazo)phenylphosphonic acid (hereinafter referred to as Dye 1) in ethanol held just below the boiling point, and rinsing extensively with ethanol and iii) phosphorylation for 5 to 10 minutes in 0.2M $POCl_3$-0.2M collidine in acetonitrile at room temperature and rinsing with water. Multilayers were formed by repeated application of these three steps. Other organic dyes containing the necessary terminal groups may be used instead of Dye 1. A schematic representation of a portion of the resultant dye multilayer film is presented in FIG. 1.

Figure 2:
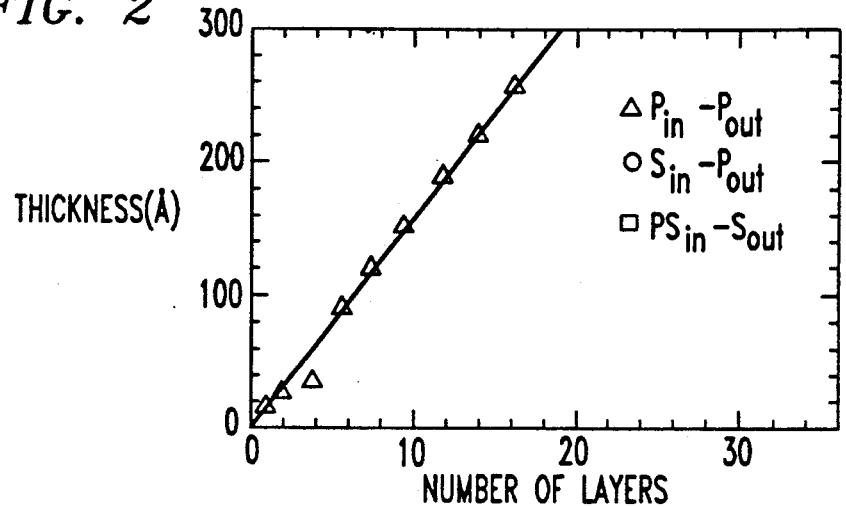
FIG. 2 is a plot of the ellipsometric thickness of multilayer films as a function of the number of deposited monolayers.

A plot of ellipsometric thickness versus number of layers of Dye 1 deposited on silicon is shown in FIG. 2, as determined in reflection from polished silicon wafers, assuming a film refractive index of 1.54; shown is the best fit line through the origin with a slope of 15.7 Angstrom per layer. The thickness per layer is consistent with the predicted thickness based on a Corey-Pauling-Koltun model-generated length of 13 Å for Dye 1 in its most extended conformation and an assumed thickness of 7 Å for the interlayer of zirconium flanked by two phosphoryldioxy groups. The deviation may indicate tilting or less-than-ideal packing of the dye molecules.

Figure 3:
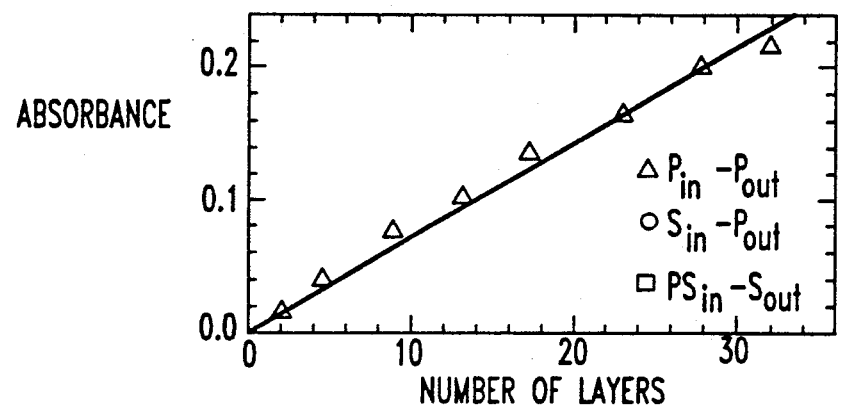
FIG. 3 is a plot of absorbence as a function of the number of monolayers in multilayer samples.
Figure 5:
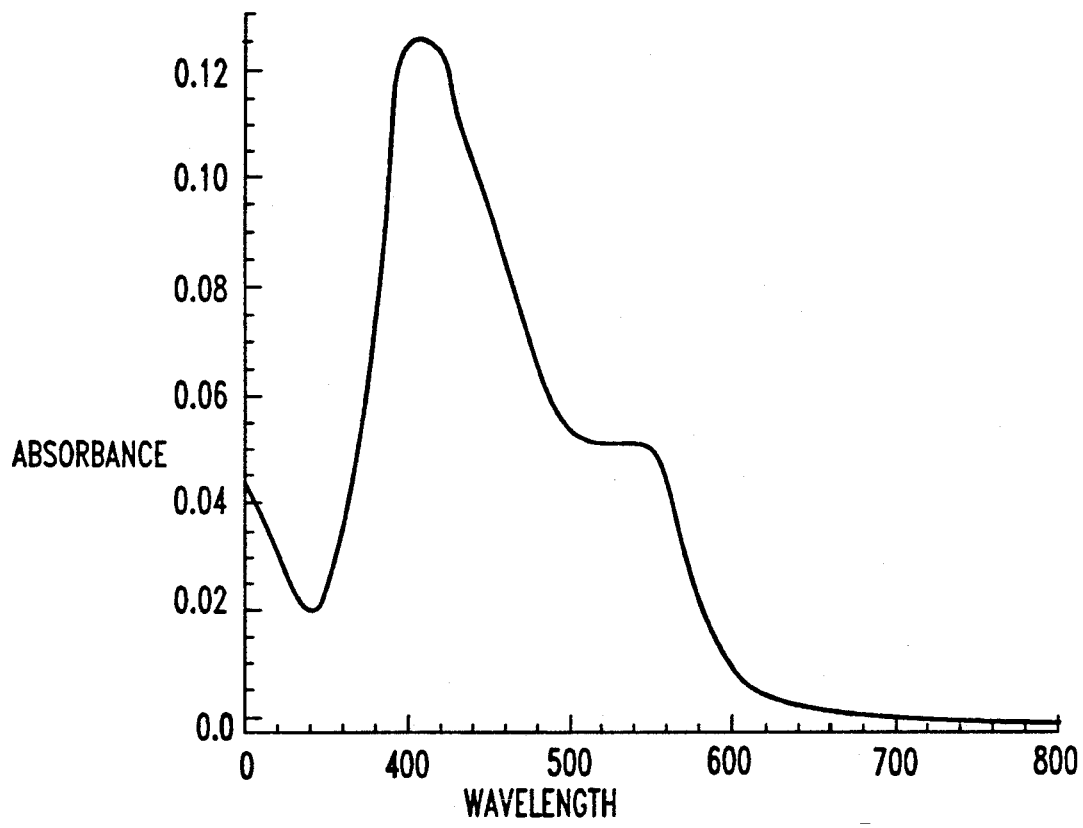
FIG. 5 is a plot of an absorption spectrum of a 20 monolayer sample.

A companion plot of absorbance at 420 nm versus number of layers on glass is shown in FIG. 3, as determined in transmission at 420 nm at normal incidence on soda lime glass with half the layers on either side of the glass substrate; shown is the best fit line through the origin with a slope of 0.0072 per layer. FIG. 5 shows the absorption spectrum of the multilayer film at wavelengths ranging from 0 to 800 nanometers.

Figure 4:
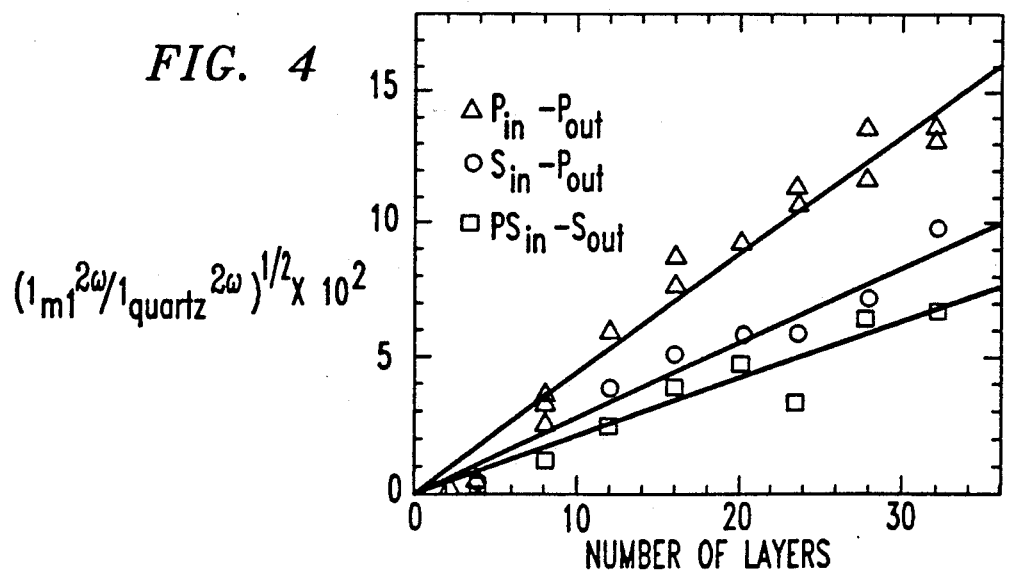
FIG. 4 is a plot of the square root of the intensity of the transmitted second harmonic generation (SHG) relative to quartz as a function of the number of monolayers; three distinct polarizations of the fundamental and the SHG are shown.

In FIG. 4, is shown the square root of the intensity of transmitted second harmonic light at 532 nm versus the number of layers on glass for three combinations of the polarizations of the fundamental and the second harmonic. The angle of incidence used is one of the angles that gives completely constructive interference between the SHG from the two sides of the glass substrate. Completely destructive interference was observed at other angles, demonstrating that the SHG is fully coherent. Lines are best fits through the origin, triangles represent fundamental p-polarized and SHG p-polarized, with slope of $2.3 \times 10^{-3}$ per layer, circles represent fundamental s-polarized and SHG p-polarized, with slope of $1.4 \times 10^{-3}$ per layer, and squares represent fundamental polarized at 45° to the plane of incidence, and SHG s-polarized, with slope of $1.1 \times 10^{-3}$ per layer. The intensities of SHG at other polarizations follow the expected function of the intensities of these three polarizations. Each of the three plots is linear, as expected for a coherent, second-order process from uniformly polar films, and the slope of the data is proportional to the effective nonlinearity of the film for that polarization.

Samples for FIGS. 2-5 were prepared from the same solutions, but the horizontal axes of FIGS. 3 and 4 cover twice as many layers because both sides of the substrates are probed. The linearity of the plots in FIGS. 2-4 indicates that the same amount of dye is deposited during each deposition cycle. This consistency is a prerequisite for a viable multilayer deposition technique.

The dye molecules in the layers of a multilayer film have the same degree of polar orientation, and do not reorient after they are covered by subsequent dye layers. No second harmonic light was observed from layers of a centrosymmetric dye, quaterthiophenediphosphonic acid, consistent with the expectation that a polar dye is necessary for second harmonic generation.

The SHG intensities reported in FIG. 4 are referenced to the SHG intensity from a quartz crystal to allow a determination of the magnitude of the nonlinearity of these films and, thus, to gauge the potential of this deposition technique for the preparation of more nonlinear materials using dyes better optimized for hyperpolarizability. Again assuming a film refractive index of 1.54, the following nonlinear coefficients are obtained from the slopes of the three plots in FIG. 4 and the layer thickness determined in FIG. 2:

$(2d_{xxz}+d_{zxx}) \cos^2 \theta_f + d_{zzz} \sin^2 \theta_f = 12$ pm/V,
$d_{zxx} = 7$ pm/V, and
$d_{xxz} = 10$ pm/V, wherein $\theta_f$ is the angle of refraction in the film (34.6° in the example embodied in FIG. 4). These nonlinearities are of the same order of magnitude as those of $LiNbO_3$, one of the widely used inorganic nonlinear materials, for which the nonzero coefficients range from 2 to 44 pm/V.

More significant than the degree of nonlinearity of these films, is the thermal stability of that nonlinearity. The SHG intensity did not significantly diminish after 3 hours at 150° C. in air. Furthermore, the reduction in SHG, that does eventually occur at higher temperatures or after much longer times at 150° C., appears to be due only to thermal degradation of the dye, rather than to molecular reorientation, because the proportionality between the square root of the SHG intensity and the optical density of the film is unchanged. The particular dye used here was selected for ease of synthesis rather than stability to degradation; therefore dyes can be found for which the films are stable to even higher temperatures.

The support for the film may be one of such substrates as glass, quartz, aluminum, gold, silicon, phosphorus-doped silicon dioxide coated on silicon, thermal silicon dioxide on silicon, conductive indium-tin oxide coated glass, conductive cadmium-tin oxide coated on glass and others. Since the monolayers are deposited from liquid solutions, the films may be deposited on substrates with diverse topographies and configuration. The substrates may be in the form of a planar solid or a non-planar solid such as a stepped or curved surface, for example a surface of an optical fiber.

The substrate preparation may be carried out with reagents or sequences of reagents that lead to a surface whose functional groups may be bound or converted to the phosphoryldioxy groups. Such functional groups include $NH_2$, $CH_2Br$, $CH_2I$, SH, OH, vinyl, and others.

Besides the preferred metal ion, $Zr^{4+}$, a variety of other metals, including Y, In, Cd, Hf, Ta, Pb, Al, Ca, and members of the lanthanide series of elements with an atomic number ranging from 57-71 may be the basis of the metal halide or metal salt reagent that is applied to the phosphoryldioxy surface.

Besides the preferred dye, Dye 1, other polar, donor-acceptor substituted organic dyes may be used to produce second order nonlinear materials. The conjugated or chromophoric part of such an organic dye may contain various combinations of donors, acceptors, aromatic and heterocyclic rings, and multiply bonded groups as generally recognized to lead to molecules with significant hyperpolarizability $\beta$, or as particularly recognized in U.S. Pat. No. 4,859,876 issued on Aug. 22, 1989 to Carl W. Dirk et al., which is incorporated herein by reference. In particular, the acceptor may include esters conceptually derived from vinyl or aryl carboxylic, sulfonic, phosphonic, or arsonic acids, with alcohols containing phosphoryldioxy groups or groups which may be converted to or bound to phosphoryldioxy groups. The donor may consist of alkyl, alkylamino, alkoxy, alkylthio, alkylphosphino, etc. or arylamino, aryloxy, arylithio, arylphosphino, etc. groups where the alkyl or aryl group is substituted by phosphoryldioxy groups or groups which may be converted or bound to phosphoryldioxy groups. Alkyl groups are chosen from alkyls with up to 18 carbon atoms. The donor may also be hydrogen. The donor and acceptor portions of the dye are preferably selected such that they, or functional groups proximal to them, may be selectively or sequentially converted or bound to phosphoryldioxy groups, or else such that one of them incorporates or has proximally a phosphoryldioxy group and the other incorporates or has nearby a group which may be converted or bound to the phosphoryldioxy group.

Polar multilayer films formed by this process can be fabricated as nonlinear optical elements for use on substrates in nonlinear optical devices. The substrate may be an independent support for the multilayer film or may form a part of the device. The multilayer film may be used as a principal propagating medium in the device, providing the optical element in which it is employed has an appropriate refractive index profile, or the multilayer film may interact with the light propagating through the substrate or an adjacent optical waveguide via an evanescent field. The film and the support may be used in place of poled polymer films in devices such as are disclosed in U.S. Pat. No. 4,859,876, supra, which is incorporated herein by reference, and may be also used in other devices based on poled polymers. The multilayer film with or without the support substrate may be used in optical fiber modulators of the type disclosed by W. Johnstone et al. "Fibre Optic Modulators Using Active Multimode Waveguide Overlays", *Electronic Letters*, Vol. 27, No. 11, 23rd May 1991, pages 894-896; M. Wilkinson et al., "Optical Fibre Modulator Using Electrooptic Polymer Overlay", *Electronics Letters*, Vol. 27, No. 11, 23 May 1991, pages 979-981; and M. Osterreid, et at., "Monitoring Electric Field Induced Refractive Index Changes In Liquid Crystals With Polymer Lightguides", *Mol. Cryst. Liq. Cryst.*, Vol. 183, 1990, pages 321-328, each of which is incorporated herein by reference. In each of these devices, the multilayer films according to this invention may be used for evanescent field coupling.

Figure 6:
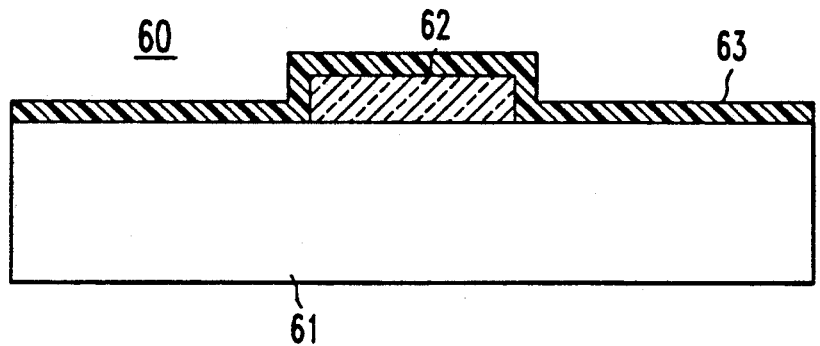
FIG. 6 is a schematic representation of a planar integrated structure including the multilayer film as an electrooptical element.

The multilayer film may also be used as the electro-optical element in a planar integrated optical structure. Shown schematically in FIG. 6 is an optical structure, 60, including a substrate, 61, a laterally patterned waveguiding element, 62, and a nonlinear optical element, 63 comprised of the polar dye multilayer. The laterally patterned waveguiding element is of a higher refractive index than the substrate, with its thickness chosen so that a substantial fraction of a guided optical field is present as an evanescent wave in the overlying polar dye multilayer.

The guided optical field may be isolated from absorption or scattering in the substrate or the overlying medium by intervening layers of lower refractive index. Electrodes may be placed above and below the multilayer film or to either side to allow electric fields to be imposed on the nonlinear optical multilayer. The guiding layer may be a high index, transparent material such as silicon nitride, germanium-doped or phosphorous-doped silicon dioxide or higher-index polymers on any lower index substrate, such as silica, silicate glass and other polymers. Composite substrates composed of a low-index, transparent layer on other substrates may also be useful, particularly to incorporate metallic or semiconducting electrodes below the nonlinear optical films.

Figure 7:
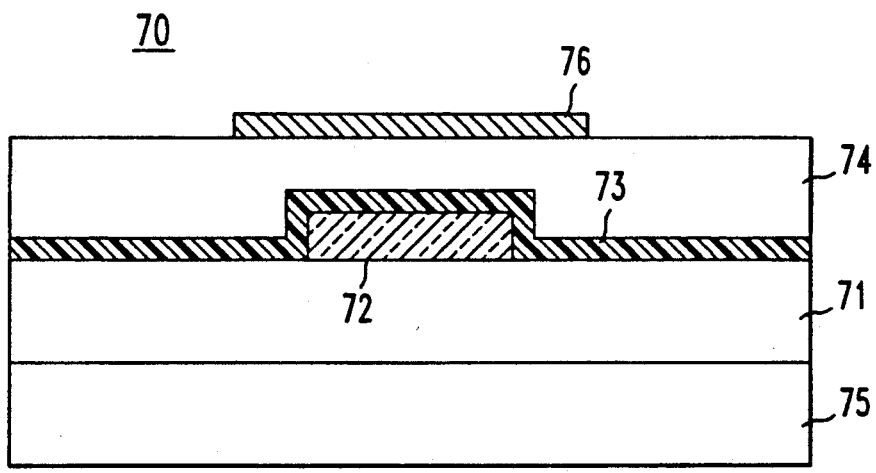
FIG. 7 is a schematic representation of an exemplary optical device.

Shown in FIG. 7 is an exemplary electrooptical device, generally denoted as 70, which includes in succession a conducting substrate 75, a lower buffer layer 71, a laterally patterned waveguide element, 72, an electro-optical element, 73, an upper buffer layer, 74, and a metal electrode, 76. The material of the waveguide element has a higher refractive index than the material of either the lower or upper buffer layers. The electro-optical element is a film of a nonlinear polar dye multilayer.

Figure 8:
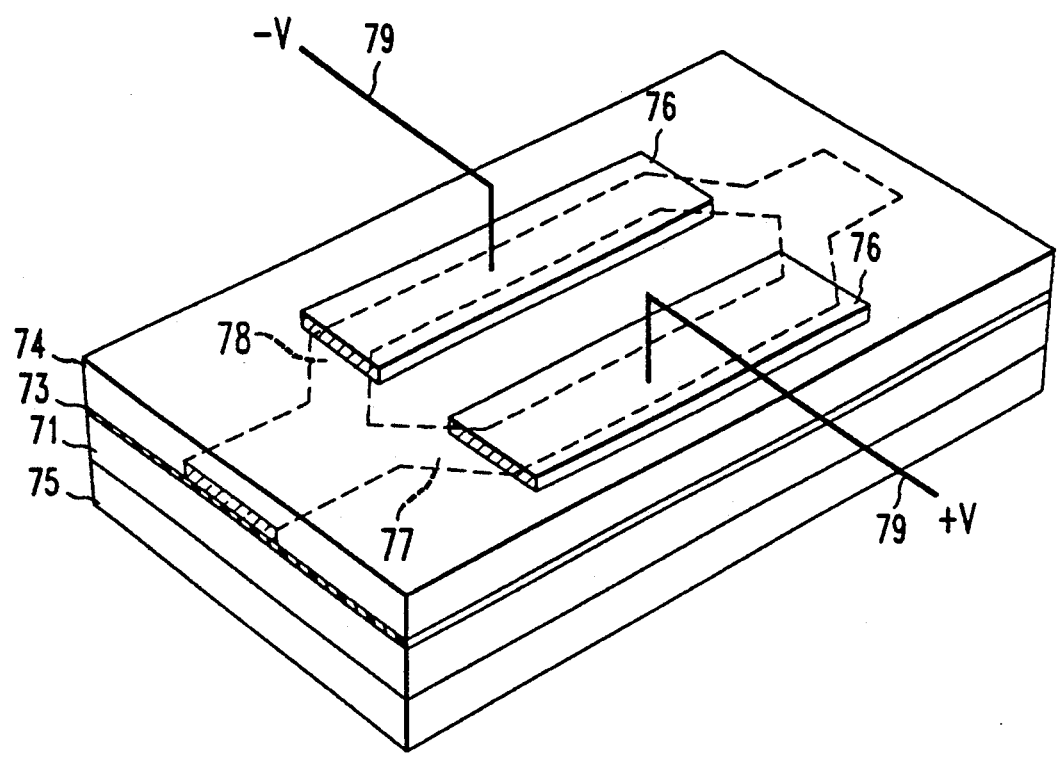
FIG. 8 is a schematic perspective representation of the exemplary optical device.

In FIG. 8 is shown a schematic perspective view of an embodiment of the device disclosed in FIG. 7. The waveguiding element 72 is patterned so as to form a section with two branches 77 and 78. Electrodes 76 overly each of the branches and are connected via conductors 79 to an electrical potential supply. In operation an optical signal propagating in the waveguide 72 will be split in half into the two branches 78 and 79. The two halves will experience different delays depending on the applied potential. After recombining the halves, the amplitude of the signal will be dependent on the applied potential.

The dipolar character of the multilayer films embodying this invention can give rise to electrical properties commonly associated with ordered non-centrosymmetric materials. Therefore, the nonlinear optical films are useful not only for devices requiring specific optical properties but also for devices relying on electrical properties associated with ordered dipoles.

We claim:

1. A process of producing a polar-ordered film on a surface, which comprises
    a) chemically modifying the surface of a support to provide phosphoryldioxy groups at the surface, wherein phoshoryldioxy refers to the $—PO_3^{2-}$, $—PO_3H^-$ and $—PO_3H_2$ groups present in phosphonic acids and their salts, and to the monoesters, monothioesters and monoamides of phosphoric acid and their salts, and wherein said support is chosen from the group consisting of glass, quartz, aluminum, gold, silicon, phosphorus-doped silicon dioxide coated on silicon, thermal silicon dioxide on silicon, conductive indium tin oxide coated on glass, and conductive cadmium tin oxide coated on glass,
    b) treating the modified surface with a halide or salt of a multivalent metal resulting in phosphoryldioxy metal termination, wherein said multivalent metal is chosen from the group consisting of Al, Ga, Hf, In, Cd, Pb, Ta, Y, Zr and elements of the lanthanide series with an atomic number ranging from 57 to 71,
    c) treating the metal terminated surface with a polar organic dye having at one end at least one of said phosphoryldioxy groups, and at the other end at least one group capable of being chemically modified to provide at least one of said phosphoryldioxy groups, and
    d) chemically modifying said other end group to provide thereat the phosphoryldioxy groups, and
    e) repeating steps b, c and d to deposit a multilayer film.

2. The process of claim 1, in which said multivalent metal comprises $Zr^{4+}$.

3. The process of claim 1, in which said support comprises silicon.

4. The process of claim 1, in which said support comprises glass.

5. The process of claim 1, in which said multilayer film is deposited on a support the surface of which has functional groups chosen from the group consisting of said phosphoryldioxy groups, functional groups to which said phosphoryldioxy groups can form chemical bonds and functional groups which may be chemically converted to said phosphoryldioxy groups.

6. The process of claim 1, in which the surface of the support has, prior to the formation of the multilayer film thereon, functional groups including at least one chosen from the group consisting of $NH_2$, $CH_2Br$, $CH_2I$, $CHCH_2$, OH and SH.

7. The process of claim 1 in which said polar organic dye is chosen from donor-acceptor substituted organic dyes in which functional groups proximal to donor and acceptor portions are chosen from the group consisting of said phosphoryldioxy groups, functional groups to which said phosphoryldioxy groups can form chemical bonds and functional groups which may be chemically converted to said phosphoryldioxy groups.

8. The process of claim 7, in which said acceptor includes at least one O-alkyl or O-aryl ester, derived from at least one of aryl and vinyl carboxylic, sulfonic, phosphonic and arsonic acids where the O-alkyl or O-aryl groups contain at least one of said phosphoryldioxy groups, functional groups to which said phosphoryldioxy groups can form chemical bonds and functional groups which may be chemically converted to said phosphoryldioxy groups.

9. The process of claim 7, in which said donor is chosen from the group consisting of alkyl, alkylamino, alkoxy, alkylthio, and alkylphosphino groups, arylamino, aryloxy, arylthio, and arylphosphino groups, and hydrogen.

10. The process of claim 1, in which said dye is 4-(4-(N,N-bis(2-hydroxyethyl)amino)phenylazo)phenylphosphonic acid.

11. The process of claim 1, in which said multilayer film contains up to 1000 monolayers.

* * * * *